(12) United States Patent
Gross et al.

(10) Patent No.: US 12,049,941 B2
(45) Date of Patent: Jul. 30, 2024

(54) DIGGING ATTACHMENT SUPPORT FOR SHOVEL

(71) Applicant: Joy Global Surface Mining Inc, Milwaukee, WI (US)

(72) Inventors: Matt Gross, St. Paul, MN (US); Austin Ross, Nashville, IN (US); Joe Brenny, Hartland, WI (US)

(73) Assignee: JOY GLOBAL SURFACE MINING INC, Milwaukee, WI (US)

( * ) Notice: Subject to any disclaimer, the term of this patent is extended or adjusted under 35 U.S.C. 154(b) by 1035 days.

(21) Appl. No.: 16/945,640

(22) Filed: Jul. 31, 2020

(65) Prior Publication Data

US 2021/0033169 A1 Feb. 4, 2021

Related U.S. Application Data

(60) Provisional application No. 62/882,273, filed on Aug. 2, 2019.

(51) Int. Cl.
  *E02F 3/36* (2006.01)
  *E02F 3/30* (2006.01)
  *F16G 11/00* (2006.01)

(52) U.S. Cl.
  CPC .............. *F16G 11/00* (2013.01); *E02F 3/308* (2013.01); *E02F 3/36* (2013.01)

(58) Field of Classification Search
  CPC .............. F16G 11/00; E02F 3/308; E02F 3/36
  USPC .................................... 414/565; 37/397, 399
  See application file for complete search history.

(56) References Cited

U.S. PATENT DOCUMENTS

| | | | |
|---|---|---|---|
| 671,014 | A | 4/1901 | Council, Jr. |
| 1,008,247 | A | 11/1911 | Dowd |
| 1,594,508 | A | 8/1926 | Rorabeck |
| 1,609,372 | A | 12/1926 | Lichtenberg |
| 1,766,343 | A | 6/1930 | McNinch |
| 1,832,493 | A | 11/1931 | Marsilius |
| 2,034,854 | A | 3/1936 | Younie |
| 2,109,195 | A | 2/1938 | Green |
| 2,403,397 | A | 7/1946 | Rankin |
| 2,947,430 | A | 8/1960 | Schneider |
| 3,543,863 | A | 12/1970 | Ball et al. |
| 3,608,755 | A | 9/1971 | Solokhin et al. |

(Continued)

FOREIGN PATENT DOCUMENTS

| | | |
|---|---|---|
| CL | 2017001261 U | 8/2017 |
| CN | 1308164 A | 8/2001 |

(Continued)

OTHER PUBLICATIONS

Chinese Patent Office Action and Search Report for Application No. 202010758732.2 dated Mar. 14, 2023 (11 pages).

(Continued)

*Primary Examiner* — Jonathan Snelting
(74) *Attorney, Agent, or Firm* — Husch Blackwell LLP

(57) ABSTRACT

A hoist rope connector for a rope shovel includes a link extending between a first end and a second end. A rope attachment member is positioned adjacent the first end and configured to engage a hoist rope. A spherical coupling is positioned adjacent the second end and configured to be coupled to a dipper. The spherical coupling permits rotational movement between the second end and the dipper in multiple directions.

9 Claims, 7 Drawing Sheets

(56) References Cited

U.S. PATENT DOCUMENTS

| | | | |
|---|---|---|---|
| 3,877,581 A | 4/1975 | Auxer | |
| 3,915,238 A | 10/1975 | Hubbell | |
| 3,933,260 A | 1/1976 | Kronlokken et al. | |
| 4,150,812 A | 4/1979 | Baron | |
| 4,329,794 A | 5/1982 | Rogers | |
| 4,464,093 A * | 8/1984 | Baron | E02F 3/302 |
| | | | D15/24 |
| 4,597,713 A | 7/1986 | Briscoe et al. | |
| 5,657,559 A | 8/1997 | Immel | |
| 6,068,405 A * | 5/2000 | Harris | F16C 33/20 |
| | | | 384/208 |
| 6,209,234 B1 | 4/2001 | Meyers | |
| 9,249,554 B2 | 2/2016 | Colwell et al. | |
| 9,482,315 B1 | 11/2016 | Dreixler et al. | |
| 9,784,103 B2 * | 10/2017 | Gross | E21C 27/30 |
| 2009/0136291 A1 | 5/2009 | McClanahan et al. | |
| 2010/0072156 A1 | 3/2010 | Mentink et al. | |
| 2014/0090279 A1 | 4/2014 | Campbell | |
| 2016/0289920 A1 | 10/2016 | Carbaugh et al. | |
| 2019/0219136 A1 | 7/2019 | Dreixler et al. | |

FOREIGN PATENT DOCUMENTS

| | | |
|---|---|---|
| CN | 103132552 A | 6/2013 |
| CN | 104514234 A | 4/2015 |
| CN | 107869158 A | 4/2018 |
| CN | 213539113 U | 6/2021 |

OTHER PUBLICATIONS

Caterpillar, "7495 Electric Rope Shovel" <https://s7d2.scene7.com/is/content/Caterpillar/C811260> copyright 2016 (32 pages).

Chilean Patent Office Action and Search Report for Application No. 202002020 dated Oct. 22, 2021 (21 pages, Including English summary).

Dipper Assembly for P&H Mining Shovel Model 2800 (DWG # 100J3356), available since Feb. 13, 1977 (4 pages).

* cited by examiner

DIGGING ATTACHMENT SUPPORT FOR SHOVEL

REFERENCE TO RELATED APPLICATION

This application claims the benefit of U.S. Provisional Patent Application No. 62/882,273, filed Aug. 2, 2019, the entire contents of which are incorporated by reference.

FIELD

The present disclosure relates to a shovel, and more particularly to a support for a rope shovel digging attachment (e.g., a dipper).

SUMMARY

In one independent aspect, a hoist rope connector is provided for a rope shovel having a hoist rope and a dipper. The hoist rope connector includes a link extending between a first end and a second end; a rope attachment member coupled to the link adjacent the first end and configured to engage a hoist rope; and a spherical coupling positioned adjacent the second end and configured to be coupled to the dipper. The spherical coupling permits rotational movement between the second end and the dipper in multiple directions.

In another independent aspect, a connection assembly is provided for a rope shovel having a hoist rope and a dipper. The connection assembly includes a pair of hoist rope connectors. One of the pair of hoist rope connectors is configured to be coupled to the dipper at a first lug and the other of the pair of hoist rope connectors configured to be coupled to the dipper at a second lug. Each of the pair of hoist rope connectors includes a link extending between a first end and a second end; a rope attachment member positioned adjacent the first end and configured to engage a hoist rope; and a spherical coupling positioned adjacent the second end and configured to be coupled to the dipper. The spherical coupling permits rotational movement between the second end and the dipper about a pivotable axis.

In yet another independent aspect, a digging assembly is provided for a rope shovel. The rope shovel includes an elongated member supported on a boom, and a hoist rope. The digging assembly includes a digging attachment, a hoist rope connector, and a spherical coupling. The digging attachment is configured to be coupled to the elongated member, and the the digging attachment includes a lug. The hoist rope connector includes a link and a rope attachment member. The link extends between a first end and a second end. The rope attachment member is positioned adjacent the first end and is configured to engage a hoist rope. The spherical coupling is supported on at least one of the second end of the link and the lug, the spherical coupling permitting rotational movement between the second end and the lug about a pivotable axis of rotation.

Other aspects of the disclosure will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

In general, the present disclosure relates to a hoist rope connector for a rope shovel. The hoist rope connector provides a simplified coupling between a hoist rope and a digging attachment and includes a spherical bearing to permit transverse rotation (e.g., due to torsional loads exerted on the dipper during a dig cycle).

Figure 1:
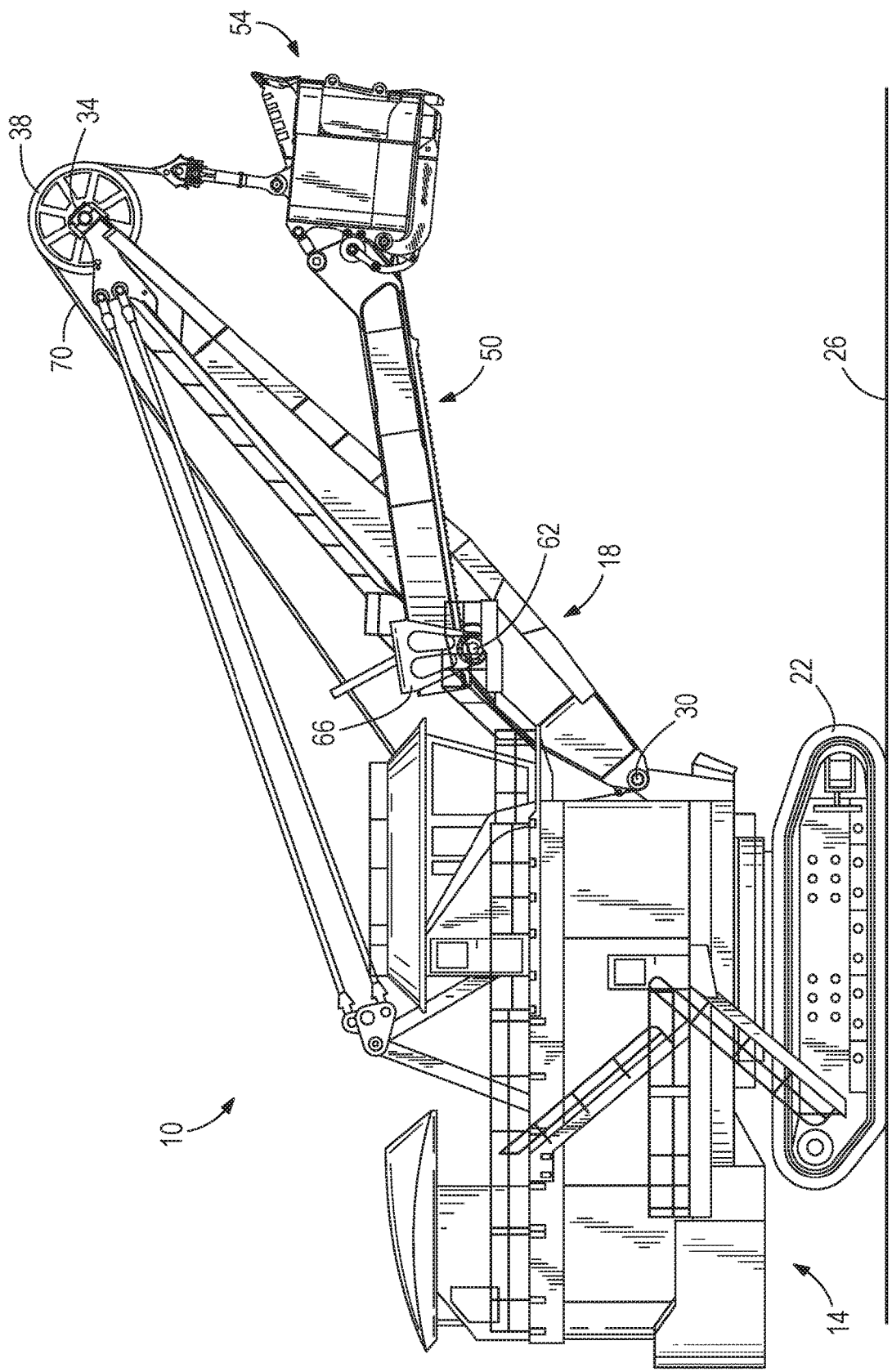
FIG. 1 is a side view of a rope shovel.

FIG. 1 illustrates a mining shovel 10 including a base 14 and a boom 18. The base 14 includes a lower portion supported by a traction mechanism (e.g., crawler tracks 22) for movement over the ground 26, and an upper portion or rotating frame supported for rotation relative to the lower portion about an axis. The boom 18 includes a first or lower end 30 and a second or upper end 34, and the lower end 30 is coupled to the rotating portion of the base 14. The upper end 34 includes a boom sheave 38.

The shovel 10 further includes an elongated member or handle 50 and a dipper 54 coupled to one end of the handle 50. In the illustrated embodiment, the dipper 54 is fixed to a distal end of the handle 50. The handle 50 is supported by a pivot support 62 for translational movement and rotational movement relative to the boom 18. In the illustrated embodiment, the pivot support 62 is a shipper shaft extending transversely through the boom 18 and including a gear surface or pinion (not shown). A lower surface of the handle 50 includes a rack (not shown) for engaging the pinion, and rotation of the pinion moves the handle 50 relative to the boom 18. Saddle blocks 66 are coupled to the shipper shaft 62 and receive a proximate end of the handle 50 to maintain engagement between the rack and pinion.

In other embodiments, the mining shovel 10 includes a bucket that is pivotable relative to the handle 50 about the distal end of the handle 50. In other embodiments, the handle may be constructed in a different manner and/or may be supported with respect to the boom in a different manner. For example, the handle may be a telescoping member that is pivotally connected to the boom by a yoke, and the handle may be driven to extend and retract by actuation of one or more fluid cylinders.

In the illustrated embodiment, the shovel 10 also includes a hoist rope 70 extending over the boom sheave 38. One end of the hoist rope 70 is coupled to the dipper 54 and supports the dipper 54. A portion of the hoist rope 70 is wrapped onto a hoist drum (not shown) supported on the base 14. Rotation of the hoist drum reels in and pays out the hoist rope 70, raising and lowering the dipper 54.

Figure 2:
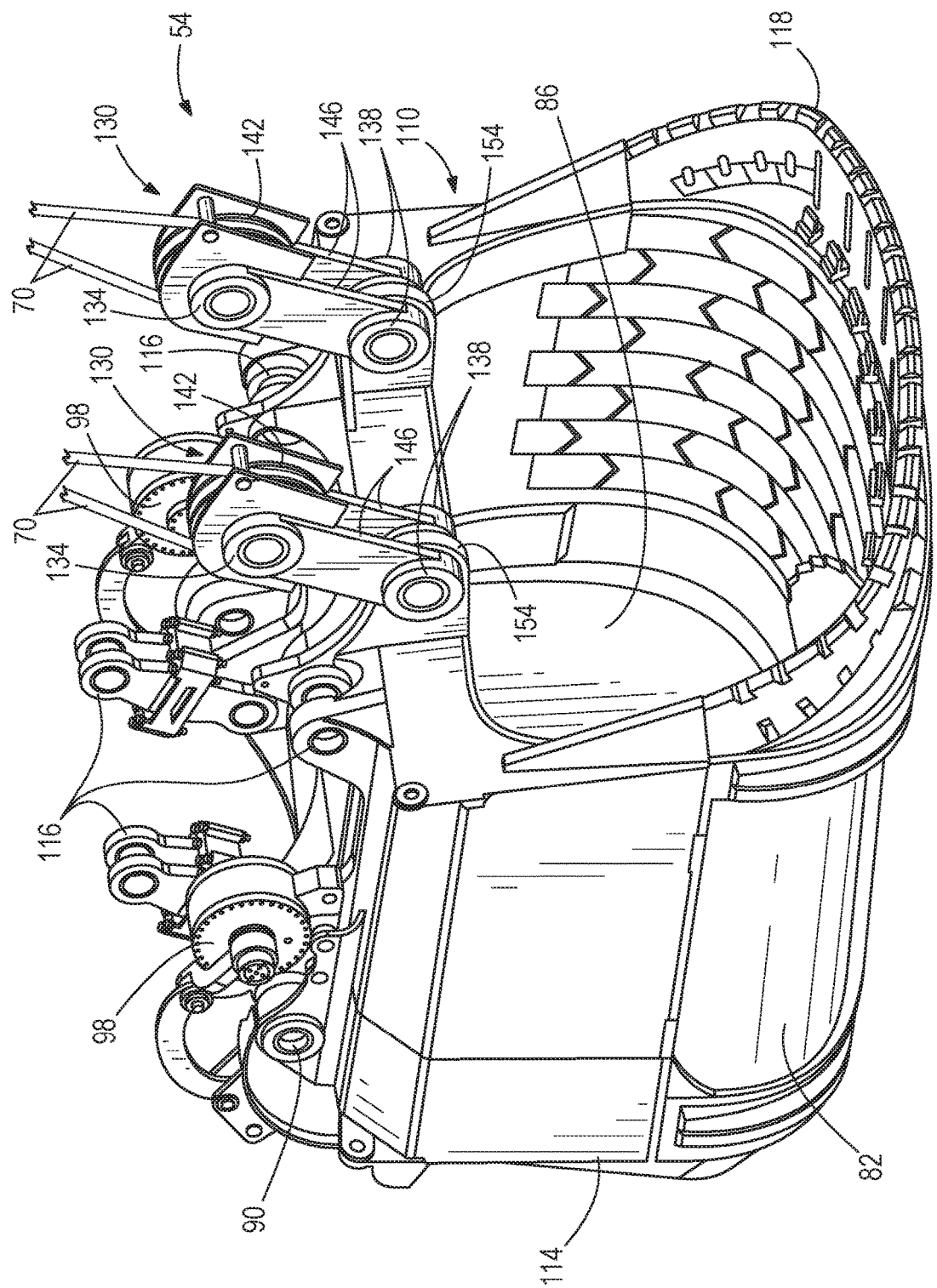
FIG. 2 is a perspective view of a dipper assembly including a hoist connector.

As shown in FIG. 2, the dipper 54 includes a dipper body 82, a dipper door 86 pivotably coupled to the dipper body 82, and snubbers 98 for damping the movement of the dipper door 86. The dipper body 82 includes a first end 110 having a material receiving opening, and a second end 114 defining a material discharging opening. The dipper body further includes handle connectors 116 for connecting the dipper 54 to the elongated member or handle 50 (shown in FIG. 1). A digging edge 118 extends around a portion of the material receiving opening. The dipper door 86 is releasably secured (e.g., by a latch) against the dipper body 82 to selectively close the material discharging opening. When released, the weight of the dipper door 86 and any material contained in the dipper body 82 causes the dipper door 86 to pivot about the door pins 90 and away from the dipper body 82, and the material falls from the dipper body 82 due to gravity.

The hoist rope 70 is coupled to the dipper 54 by hoist rope connectors 130 (sometimes referred to as "padlocks"). In the illustrated embodiment, the dipper 54 includes a pair of hoist rope connectors 130, each coupled to the dipper 54 independently of one another. In the illustrated embodiment, the hoist rope connectors 130 include a sheave at a first end of the hoist rope connector 130, and connections to the dipper 54 at a second end of the hoist rope connector 130.

Figure 3:
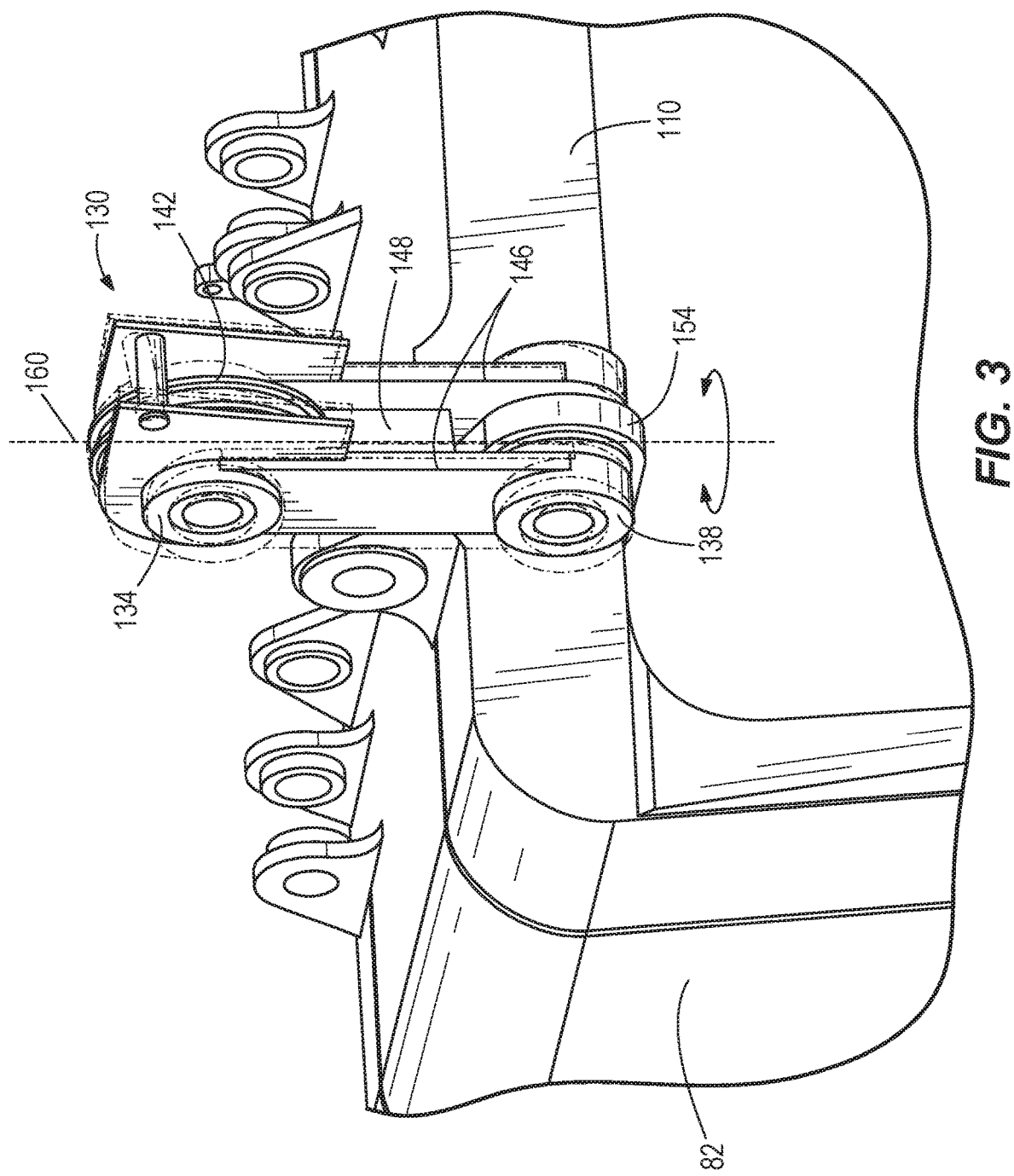
FIG. 3 is an enlarged perspective view of a dipper and the hoist connector of FIG. 2.
Figure 3A:
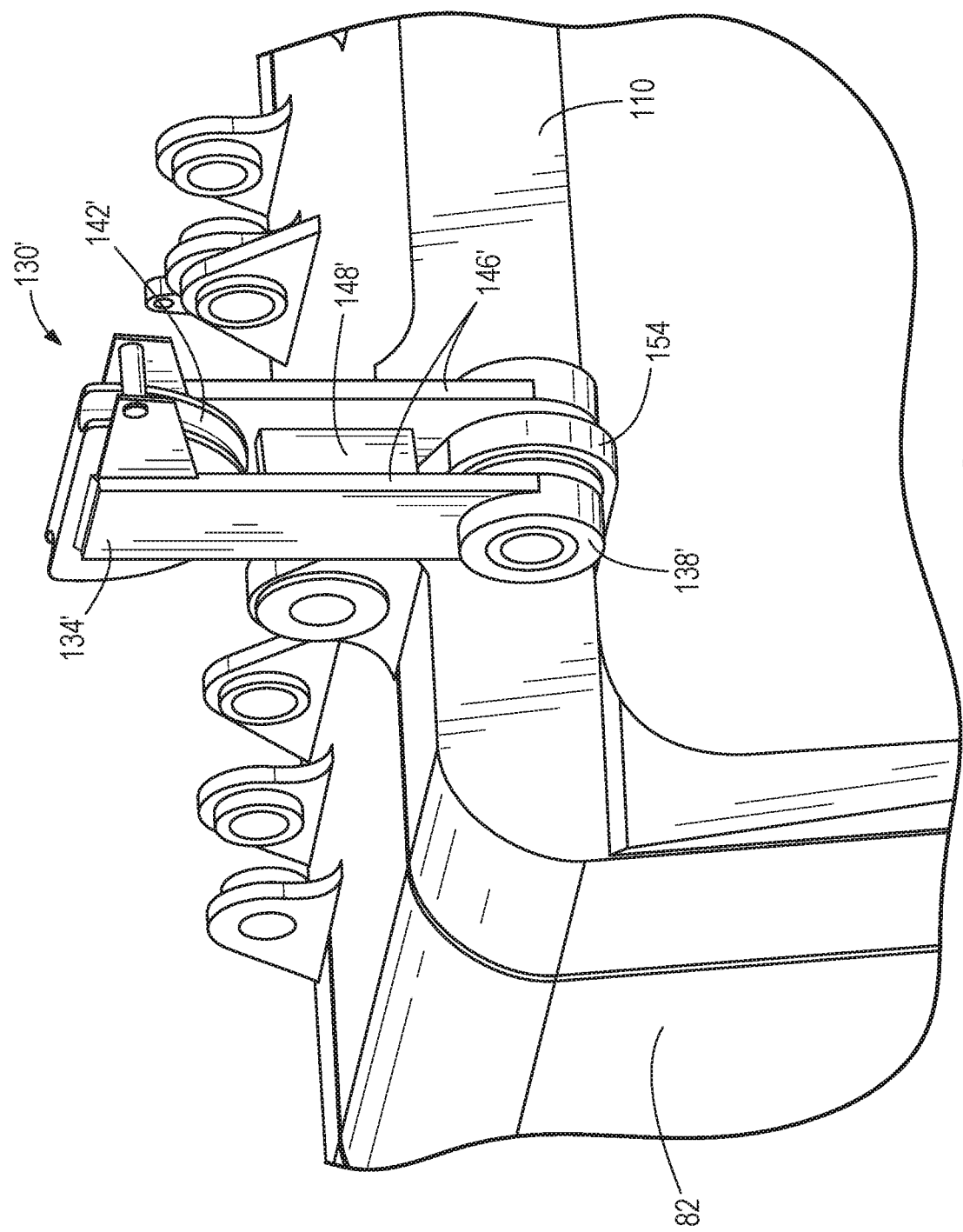
FIG. 3A is an enlarged perspective view of a dipper and a hoist connector according to another embodiment.

FIG. 3 illustrates an embodiment of the hoist rope connector 130. In FIG. 3, the hoist rope connector 130 includes a link extending between a first end 134 and a second end 138. A rope attachment member 142 is supported in or adjacent to the first end 134. In the illustrated embodiment, the rope attachment member 142 is a sheave having a generally circular profile. In other embodiments, the rope attachment member may have a different shape. For example, as shown in FIG. 3A, the rope attachment member 142' may have a semi-circular or D-shape with an arcuate outer portion for engaging the hoist rope 70. In some embodiments, the rope attachment member may include a clamping member for securing the hoist rope 70.

In the illustrated embodiment, the link of the hoist rope connector 130 includes a pair of legs 146 extending between the first end 134 and the second end 138, and the rope attachment member 142 is supported between the legs 146. In addition, the rope attachment member 142 may be supported by a pin extending between the legs 146. In other embodiments, as shown for example in FIG. 3A, the rope attachment member 142' may be secured to the first end 134 of the legs 146 without permitting relative movement of the rope attachment members 142'. In some embodiments, a web 148 (FIG. 5) may be positioned between the legs 146 to improve the rigidity of the hoist rope connector 130.

Figure 4:
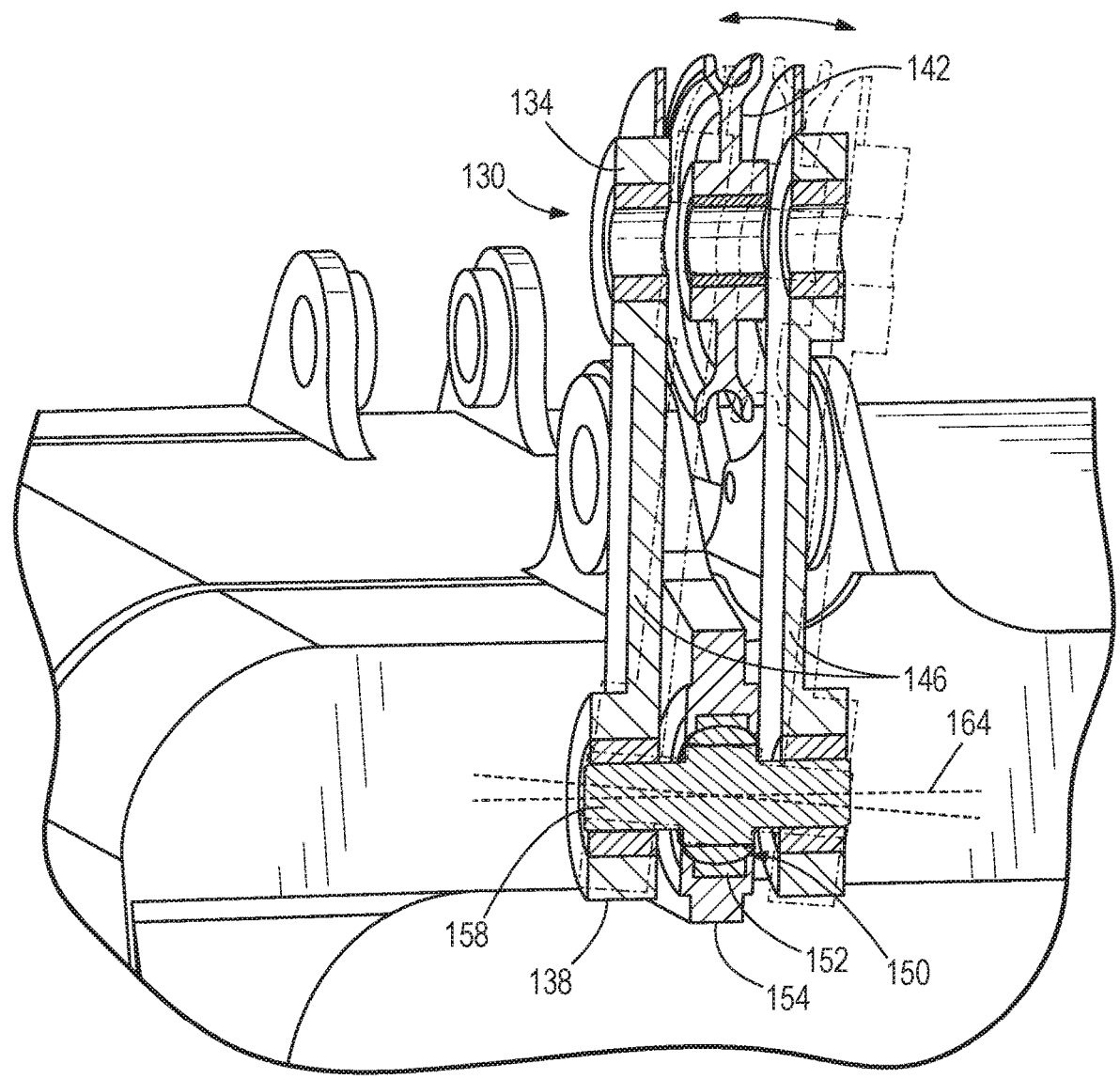
FIG. 4 is a section view of the embodiment of the hoist connector shown in FIG. 3, viewed along section 4-4.
Figure 5:
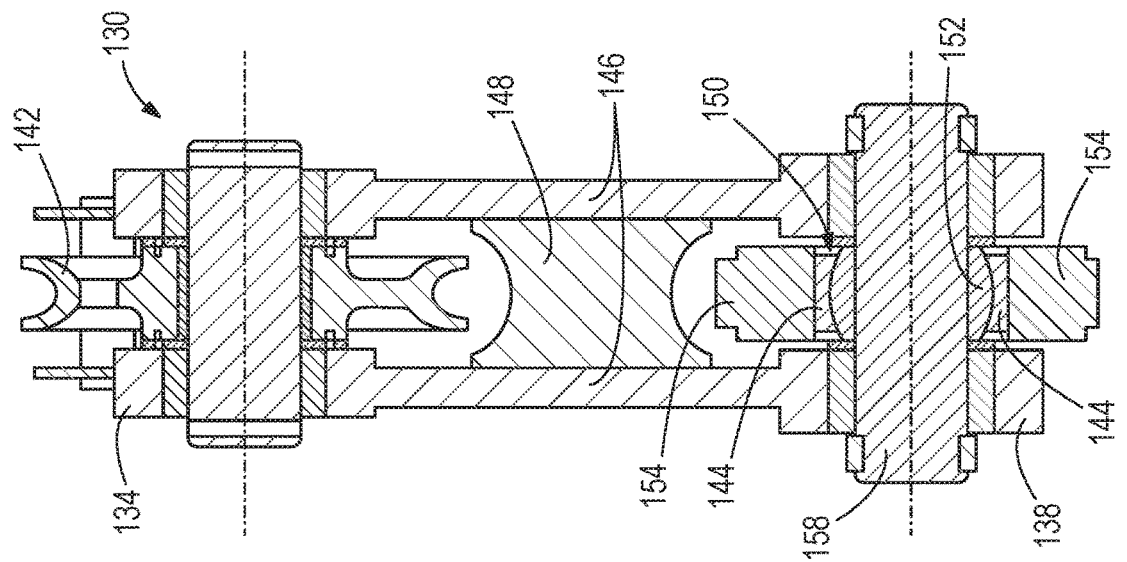
FIG. 5 is another section view of the embodiment of the hoist connector shown in FIG. 3.

As shown in FIGS. 4 and 5, the second end 138 of the hoist rope connector 130 is coupled to the dipper body 82 by a spherical coupling 150 (e.g., a spherical plain bearing). In the illustrated embodiment, a spherical bearing 152 is supported directly in a lug 154 attached to the dipper body 82, and a straight pin 158 is connected between the legs 146 of the connector 130 and extends through lug 154. The spherical bearing 152 rotates against a bushing 144 positioned within the lug 154, which allows for both rotation (i.e., rotation about an axis of the straight pin 158) and twisting (i.e., reorientation or pivoting of the axis 164 (FIG. 4) of the straight pin 158 relative to the lug 154) of the hoist rope connector 130 relative to the lug 154. In other embodiments, the spherical bearing 152 may rotate directly against the lug 154 without bushings.

The twisting or pivoting can occur in multiple directions. For example, the spherical bearing 152 may permit twisting in a plane that is generally parallel to the axis of the straight pin 158 and extends through the length of the hoist rope connector 130 (e.g., as shown by the arrow and dashed line profile in FIG. 4). In addition, as illustrated in FIG. 3, the spherical bearing permits twisting about an axis that is perpendicular to the axis of the straight pin 158 and extends along a length of the hoist rope connector 130 (e.g., about a longitudinal axis 160 of the hoist rope connector 130). Stated another way, the hoist rope connector 130 may pivot about an axis that is substantially parallel to the hoist rope 70. It is understood that the portions of the hoist rope 70 that engage the rope attachment member 142 may not be precisely aligned with the longitudinal axis 160; for example, as shown in FIG. 2, the portions of the hoist rope 70 are oriented tangentially with respect to the curved surface of the rope attachment member 142.

In some embodiments, the boom sheave 38 includes multiple sheaves positioned along the same axis at the upper end 34 of the boom 18. In the illustrated embodiment, a pair of sheaves is associated with the hoist rope 70 that extends around the rope attachment member 142 associated with one of the hoist rope connectors 130 (i.e., one sheave receives a first portion of the hoist rope 70 that extends "out" and around the hoist rope attachment member 142, and a second sheave receives a second portion of the hoist rope 70 that "returns" from the rope attachment member 142). Because the sheaves are aligned with each other, the two portions of the hoist rope 70 are parallel to each other as they pass over the boom sheave 38, but are oriented at a 90 degree angle relative to the orientation of the rope portions engaging the rope attachment member 142. Allowing for twisting about the longitudinal axis of the hoist rope connector 130 perpendicular to the straight pin 158 may reduce kinking in the hoist rope 70 as the dipper 54 is hoisted to a position adjacent the boom sheave 38.

Figure 6:
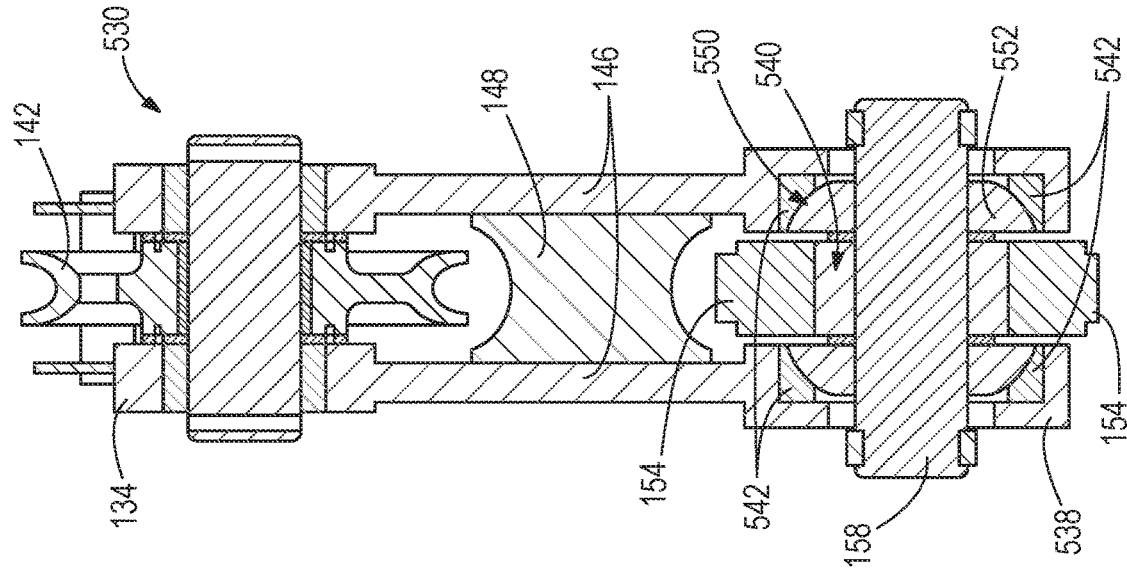
FIG. 6 is a section view of another embodiment of a hoist connector.

FIG. 6 illustrates another embodiment of a hoist rope connector 530 including another configuration of the spherical coupling 550 in which the lug 154 supports a straight bearing element 540 and a spherical bearing element 552. The spherical bearing element is supported in an inner portion of the second end 538 of the hoist rope connector 530 and is rotatable against bushings 542 positioned within the second end 538. In the illustrated embodiment, the inner portion has a generally rectangular cross-sectional profile. Among other things, positioning the spherical bearing 552 in the hoist rope connector 130 may permit the use of the hoist rope connector 130 without requiring a spherical bearing to be installed within an opening of the lug 154, while allowing for both rotation and twisting of the hoist rope connector 130 relative to the lug 154. In other embodiments, the spherical bearing 152 may rotate directly against the second end 538 without bushings.

Figure 7:
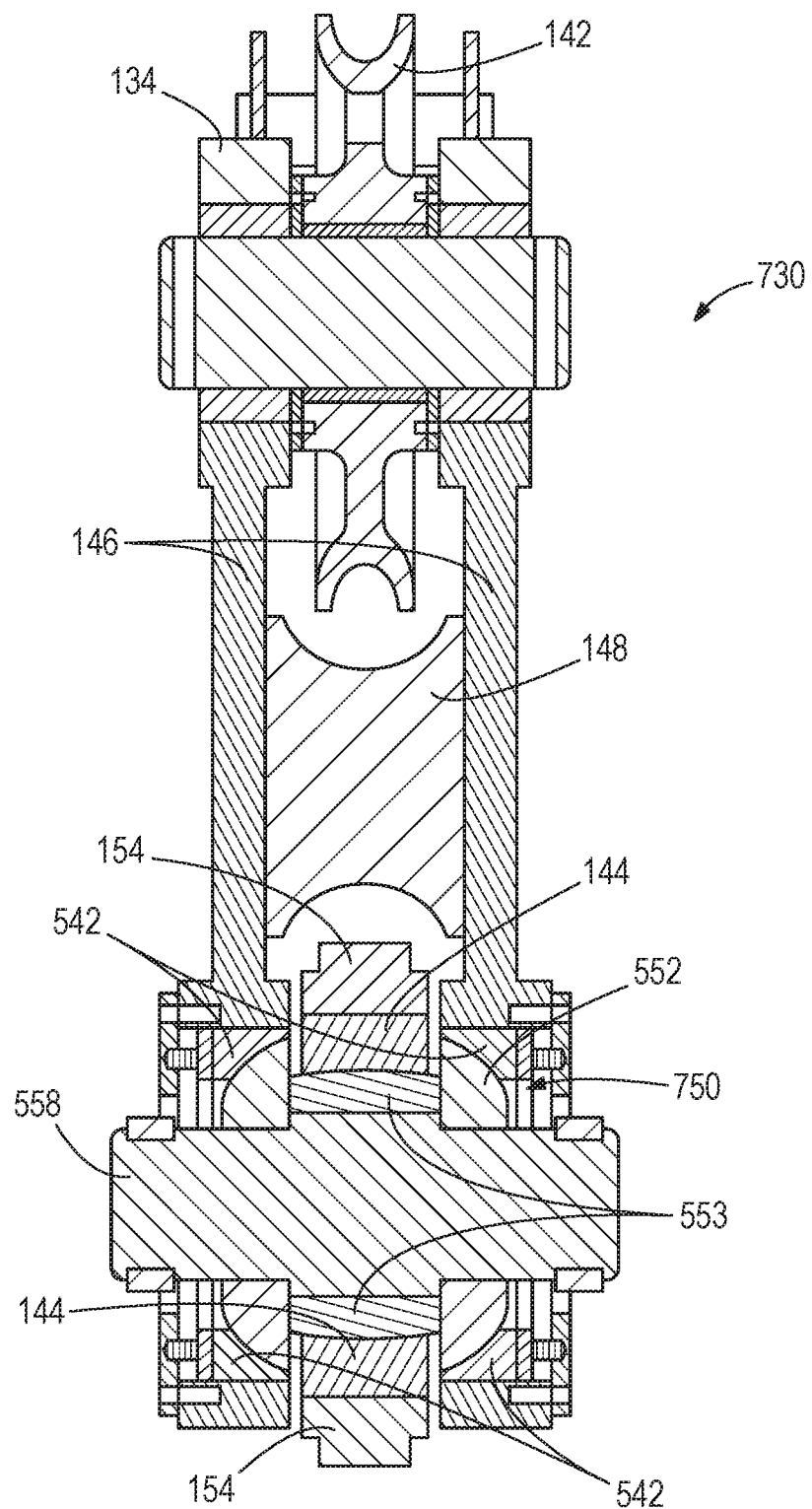
FIG. 7 is a section view of yet another embodiment of a hoist connector.

In another embodiment of a hoist rope connector 730, shown in FIG. 7, the spherical coupling 750 may include a stepped pin 558 (e.g., the pin 558 includes a first section having a radius that is different from a radius of a second section of the pin 558). In the illustrated embodiment, the stepped pin 558 is mounted in a similar manner to the pin 158 of the hoist rope connector 530 illustrated in FIG. 6 but differs in that a curved bearing element 553 is provided on the pin 558 to rotate within the lug 154. The spherical bearing 552 is rotatable and twistable against the bushings 542. The curved beam element 553 of the stepped pin 558 is rotatable and twistable against the bushings 144 provided within the lug 154. The use of both the curved bearing element 553 and the spherical bearing 552 provides additional ease of mobility of the lug 154 relative to the hoist rope connector 730.

The hoist rope connector 130, 530, 730 incorporates a spherical coupling, eliminating the need for the second pin join while still permitting transverse rotation (i.e., rotation in two planes or torsional twist) that may be required due to torsional loads exerted on the dipper 54 during a dig cycle. The hoist rope connector 130 thereby provides a simplified structure, improves dumping height, and reduces weight and cost associated with the dipper 54, thereby improving overall performance such as overall payload of the shovel 10. Spherical thrust washers may further be provided in conjunction with the spherical coupling 150, 550, 750 to absorb loads and provide better performance of the spherical coupling 150, 550, 750.

In some embodiments (e.g., FIG. 6), the spherical coupling 550 is supported by the second end 538 of the hoist rope connector 530. In other embodiments (e.g., FIG. 5), the spherical coupling 150 is supported by the dipper lug 154. In other embodiments (e.g., FIG. 7), portions of the spherical coupling 750 are supported in both the second end of the hoist rope connector 730 and in the dipper lug 154.

The simplified structure of the hoist rope connector according to the preferred embodiments disclosed herein allows the dipper 54 to be raised higher than dippers with conventional configurations (for example, configurations including a cross member). A hoist rope connector according to the preferred embodiments herein further allows for better control of the dipper 54 by providing two attachment points for the hoist rope 70 to dipper 54.

The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

What is claimed is:

1. A connection assembly for a rope shovel, the rope shovel including a hoist rope and a dipper, the connection assembly comprising:
   a pair of hoist rope connectors, one of the pair of hoist rope connectors configured to be coupled to the dipper at a first lug and the other of the pair of hoist rope connectors configured to be coupled to the dipper at a second lug, each of the pair of hoist rope connectors including,
   a link including a pair of parallel legs extending between a first end and a second end;
   a rope attachment member coupled between the parallel legs adjacent the first end, the rope attachment member supported by a pin extending through both legs and configured to engage a hoist rope; and
   a spherical coupling positioned adjacent the second end and configured to be coupled to the dipper, the spherical coupling permitting rotational movement between the second end and the dipper about a pivotable axis.

2. The connection assembly of claim 1, wherein the spherical coupling includes a spherical bearing and a second pin supported by the spherical bearing, the second pin configured to engage an associated one of the first lug or second lug of the dipper.

3. The connection assembly of claim 1, wherein the spherical coupling includes a spherical bearing, a second pin supported by the spherical bearing and configured to be coupled to an associated one of the first lug or second lug of the dipper, and a connector bushing, the spherical bearing rotatably engaging the connector bushing.

4. The connection assembly of claim 3, wherein the second end of each link includes a substantially rectangular portion supporting the connector bushing, the connector bushing configured to limit translational movement of the associated spherical bearing.

5. The connection assembly of claim 1, wherein the spherical coupling includes a spherical bearing and a stepped pin supported by the spherical bearing, the stepped pin configured to be rotatably coupled to a respective lug of the dipper for rotating against a bushing of the lug, the spherical coupling further including a connector bushing, the spherical bearing rotatably engaging the connector bushing.

6. The connection assembly of claim 5, wherein the second end includes a substantially rectangular portion for housing the connector bushing, the connector bushing configured to limit translational movement of the respective spherical bearing.

7. The connection assembly of claim 1, wherein the rope attachment member is supported for rotation relative to the link.

8. The connection assembly of claim 1, wherein the spherical bearing is supported between the legs, each of the host rope connectors oriented parallel to one another.

9. The connection assembly of claim 1, wherein the rope attachment member includes an arcuate outer surface, the outer surface extending around an axis that is substantially parallel to an axis of rotation of the spherical coupling.

* * * * *